Figure 1:
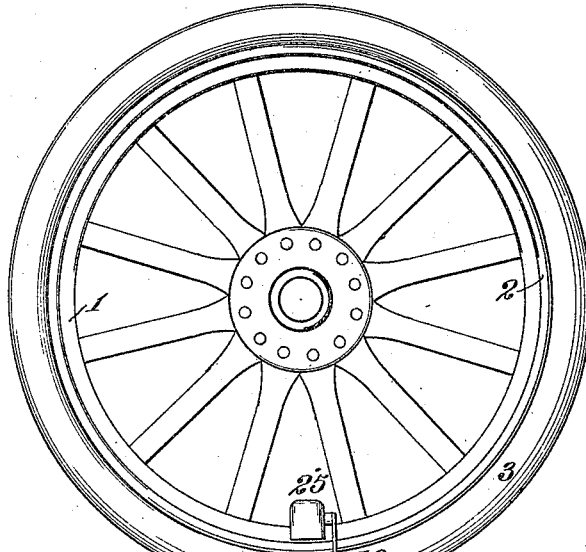

O. F. SCHROEDER.
AUDIBLE SIGNAL FOR PNEUMATIC TIRES.
APPLICATION FILED DEC. 13, 1920.

1,373,453.

Patented Apr. 5, 1921.

Inventor.
O. F. Schroeder
By Cicero & Totten
Attorneys

UNITED STATES PATENT OFFICE.

OTTO FRED SCHROEDER, OF SANTA ANA, CALIFORNIA.

AUDIBLE SIGNAL FOR PNEUMATIC TIRES.

1,373,453.	Specification of Letters Patent.	Patented Apr. 5, 1921.

Application filed December 13, 1920. Serial No. 430,228.

*To all whom it may concern:*

Be it known that I, OTTO FRED SCHROEDER, a citizen of the United States, residing at Santa Ana, in the county of Orange and State of California, have invented certain new and useful Improvements in Audible Signals for Pneumatic Tires, of which the following is a specification.

This invention relates to an audible signal adapted for use in connection with pneumatic tires of various diameters to denote on each revolution of the wheel the degree of deflation of the tire.

The present invention is designed to be applied to vehicle wheels mounting tires of different diameters, without the necessity of adjusting the apparatus, thus providing an apparatus capable of universal use, *i. e.* of use in connection with tires of different cross sectional diameters.

Another object is to provide an alarm designed by audible means to indicate the degree of deflation of a tire thus not only warning the vehicle operator when a vehicle tire becomes slightly deflated owing to a slow leak, but, at the same time, providing an alarm which will, by rapid soundings of an audible signal on each revolution of the tire warn the operator that the tire has become deflated to such an extent as to be seriously injured if the use of the same in its deflated condition is continued.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the preferred embodiment thereof illustrated in the drawings, and wherein:—

Figure 2:
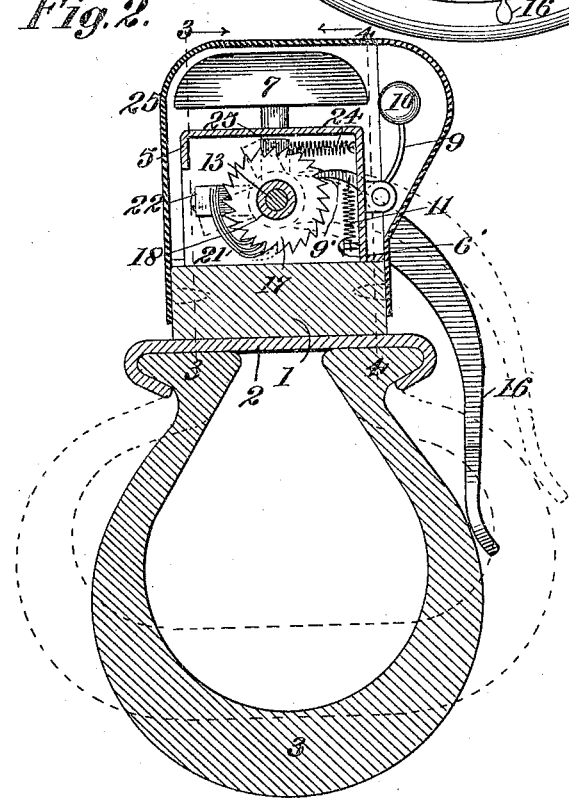
Figure 3:
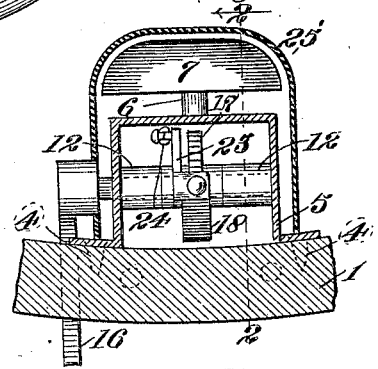
Figure 4:
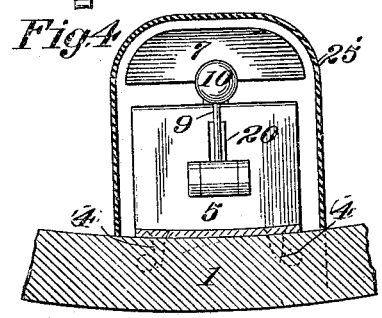

Figure 1 is a view in elevation of a vehicle wheel with my invention applied thereto, Fig. 2 is a cross sectional view taken on line 2—2 of Fig. 3, Fig. 3 is a detail cross sectional view taken on line 3—3 of Fig. 2 viewed in the direction of the arrows, and Fig. 4 is a vertical cross sectional view of the invention taken on line 4—4 of Fig. 2 viewed in the direction of the arrows.

Referring more particularly to the drawings wherein like characters of reference designate corresponding parts, 1 indicates a wheel felly, 2 the wheel rim, and 3 a pneumatic tire mounted thereon. Detachably secured to the felly 1 by suitable screws 4 is a rectangular base or bracket 5 preferably of metal, and the same carries preferably on its upper surface a post 6 mounting a suitable audible signal such as a bell 7. Pivotally mounted within its length on the fulcrum 8 is a suitable bell clapper 9 of spring material, and having a head 10 adapted to lie adjacent to the peripheral edge of the bell 7, and the upper end of said clapper is normally drawn toward the edge of the bell by a coiled spring 11, illustrated as being secured at one end by a pin 6', and at its opposite end to the clapper dog 9'. Disposed transversely of the base 5 and parallel with the fulcrum 8, and mounted at its end to rotate in bearings 12 in the side walls 12' of the base is a shaft 13. From the end of the shaft 13, at a point exteriorly of the base 5, extends an operating lever 16 disposed at substantially right angles to the axis of rotation of the shaft, and adapted to contact within its length with the side wall of the pneumatic tire 3. The lever 16 is secured to the shaft 13 to impart a slight rotative movement thereto, on the flattening of the tire, due to deflation, at a point adjacent the lever, on each successive rotation of the wheel.

Rotatably supported on the shaft 13 between bearings 12 is a clapper operating wheel 17 having a toothed edge 18 with which contacts the dog 9' of the clapper 9, which extends through a slot 20 in the side wall of the base 5. A multiple leaf spring pawl engages the teeth 18 of the wheel 17 to impart a step rotation thereto in the direction of the arrow on an outward swinging movement of the lever 16, and said pawl is preferably constructed of superimposed spring plates 21 upwardly curved at their free ends, and at their rear secured to an arm 22 extended from a collar 23 secured to rotate with the shaft 13. A spring 24 secured to an arm 25 radiating from the collar 23, and also secured to the side wall of the base 5 normally draws the laminated pawl upwardly over the teeth of the wheel 17 on the release of pressure on the lever 16, and maintains the lever in contact with the side wall of the tire at all times.

A suitable casing or housing 25' removably secured to the base 5 protects the working parts of the construction from injury, and said casing is provided with an opening through which one end of said shaft 13 extends, and within which the same operates.

From my construction it will be observed that a single model is adapted for use in connection with tires of different cross sectional areas, and is thus adapted for universal use, and it will also be apparent that, by employing a laminated pawl to engage the periphery of the wheel 17, one of such laminations is at all times in engagement with one of the teeth of a wheel to impart a slight rotative movement thereto, on but a slight swinging movement of the lever.

Having thus described my invention what I claim as new and desire to secure by Letters Patent of the United States is:—

1. A tire alarm device comprising a base for attachment to a wheel, a bell secured thereto, a bell clapper associated with the bell and provided with a pawl integral therewith, a toothed wheel coöperating with the clapper for operating the same, a lever disposed to extend adjacent to the side wall of a vehicle tire, a pawl coöperating with the teeth of said wheel and connected with said lever to actuate said clapper in accordance with the degree of movement of the lever.

2. A tire alarm comprising a base for attachment to a wheel, a bell secured thereto, a pivotally mounted bell clapper associated therewith and provided with an operating pawl integral therewith, a rotatable shaft, a toothed clapper actuating wheel rotatably mounted on said shaft and arranged with said clapper pawl engaging the teeth of said wheel, a lever fixed to the shaft and disposed with its free end lying adjacent to the outer surface of a vehicle tire, a spring for maintaining the lever in contact with the vehicle tire, a pawl coöperating with the toothed wheel, and a connection between the pawl and shaft whereby movement of the lever imparts rotation to said wheel in one direction.

3. A tire alarm including a base for attachment to a wheel, a bell associated with the base, a pivotally mounted clapper carried by the base and associated with the bell, an operating pawl associated with the clapper, a spring for normally forcing the clapper toward the bell, a rotary shaft, a toothed wheel rotatably mounted thereon with the teeth thereof in engagement with said clapper pawl, said pawl precluding rotation of said wheel in one direction, a lever fixed to the shaft and extending at right angles therefrom with its free end lying adjacent to the side wall of a vehicle tire, a laminated pawl, an arm supporting one end thereof and fixed to rotate with said shaft, said pawl coöperating with the teeth of said wheel whereby rotation is imparted thereto on each movement of the lever in one direction, means for moving the pawl over the teeth of said wheel and for maintaining the lever in contact with the tire in its movement in a reverse direction, and a casing for the apparatus.

4. A tire alarm device comprising a base for attachment to a wheel, a bell secured thereto, a bell clapper associated with the bell and provided with a pawl, a rotatable shaft, a toothed wheel loosely mounted thereon for coöperating with the pawl for operating the clapper, a lever associated with the shaft and disposed to extend adjacent to the side wall of a vehicle tire, means coöperating with said toothed wheel and connected with said shaft to rotate said wheel with the shaft in one direction in accordance with the degree of movement of the lever, said pawl precluding the rotation of the wheel in a reverse direction.

5. A tire alarm including a base for securing to a wheel, a bell mounted thereon, a bell clapper supported within its length on said base and disposed with its upper end lying adjacent to said bell, a pawl integral with and extending angularly from the lower end of said clapper, a rotatable shaft mounted in bearings in said base and disposed transversely of said pawl, a lever extended at right angles therefrom and disposed with its free end lying adjacent to one surface of the tire, a peripherally toothed wheel carried by said shaft with its toothed periphery in engagement with said clapper pawl, a spring for maintaining said pawl in engagement with said toothed periphery, an arm disposed laterally from the shaft at one side of said wheel, a pawl secured at one end of the arm and including a plurality of yieldable laminations curved at their free ends to engage the toothed periphery of said wheel, and a spring associated with said arm for maintaining the free end of said lever in contact with its coöperating tire surface.

In testimony whereof I have signed my name to this specification.

OTTO FRED SCHROEDER.